Oct. 6, 1964    F. J. WINCHELL    3,151,496
TRANSMISSION SHIFTER CONTROLS
Filed April 17, 1961    4 Sheets-Sheet 3
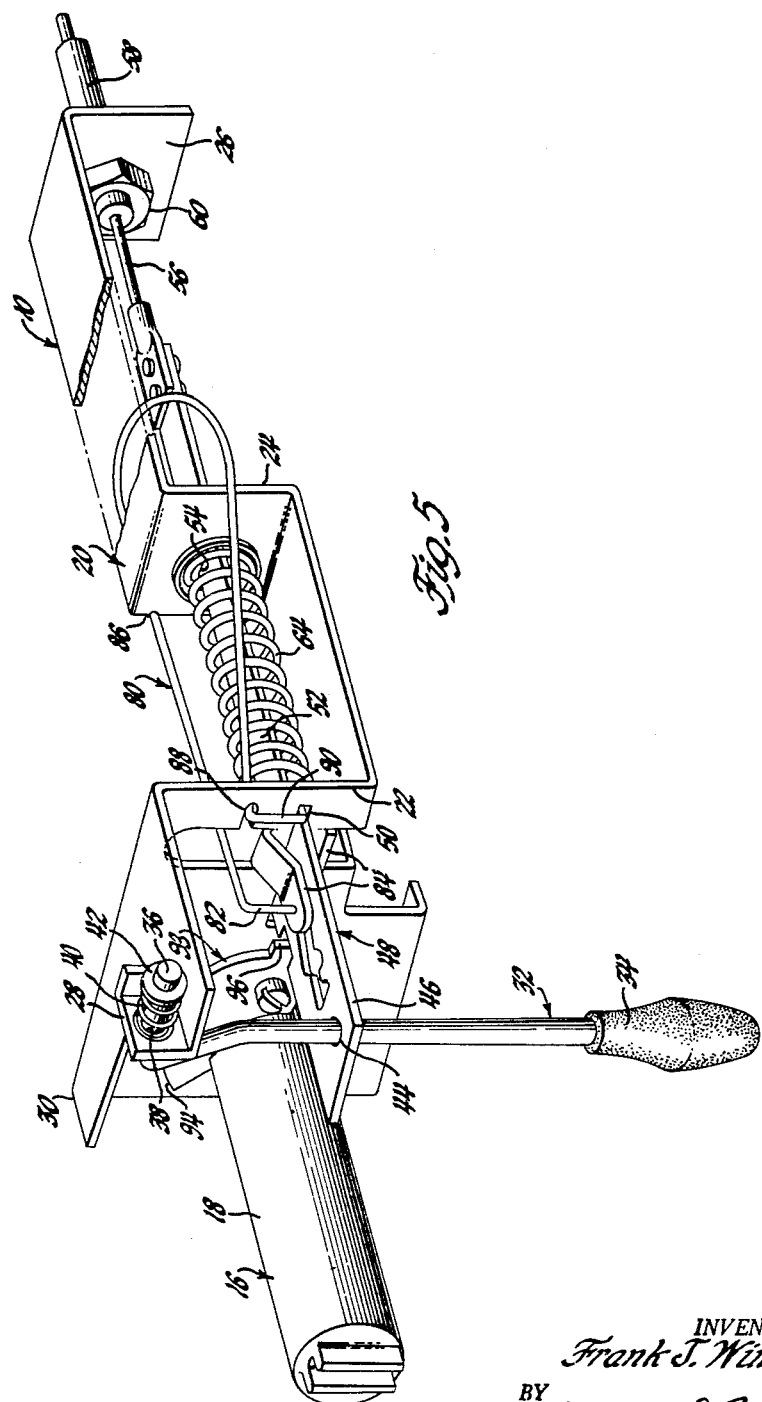
INVENTOR.
Frank J. Winchell
BY
Hugh L. Fisher
ATTORNEY

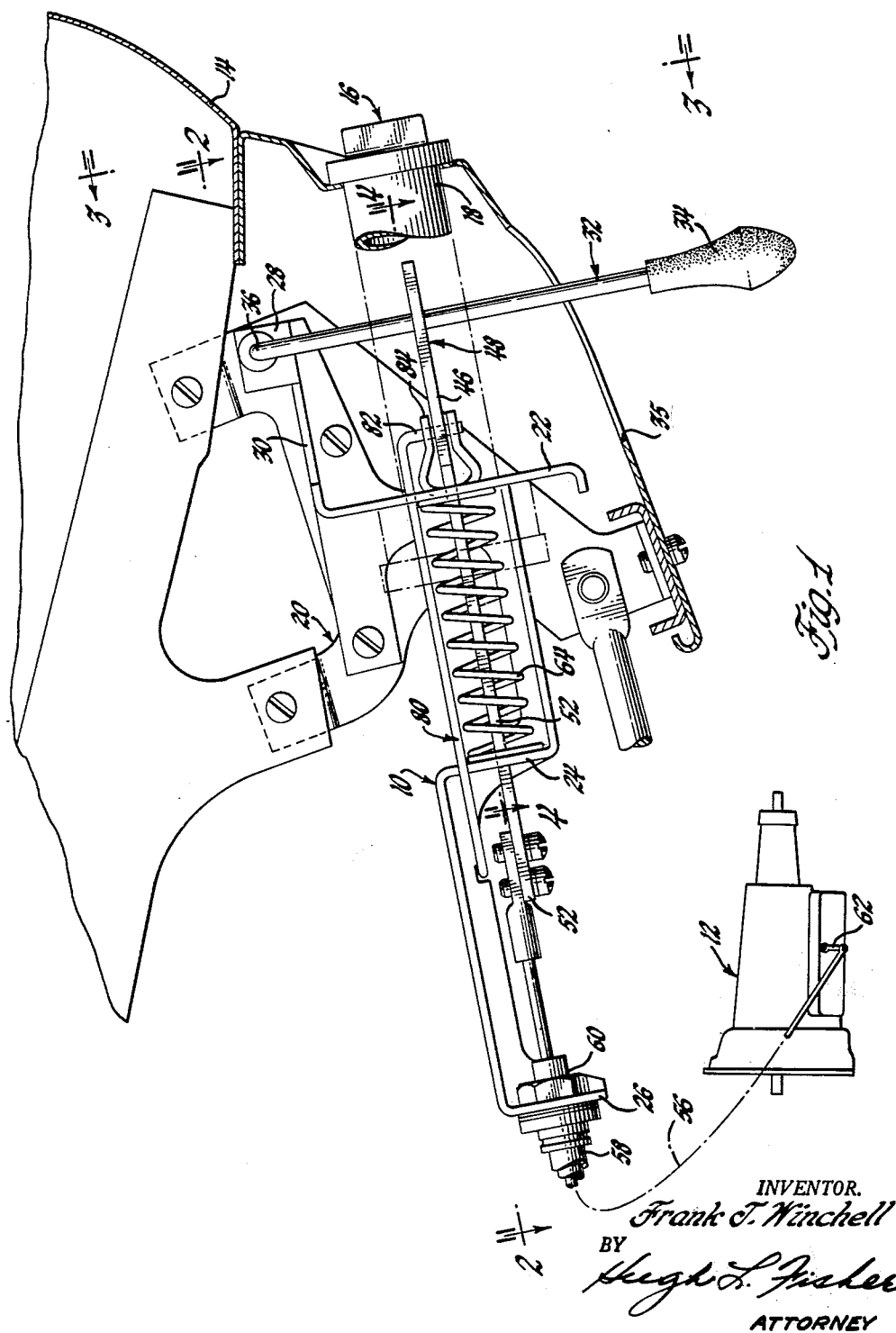

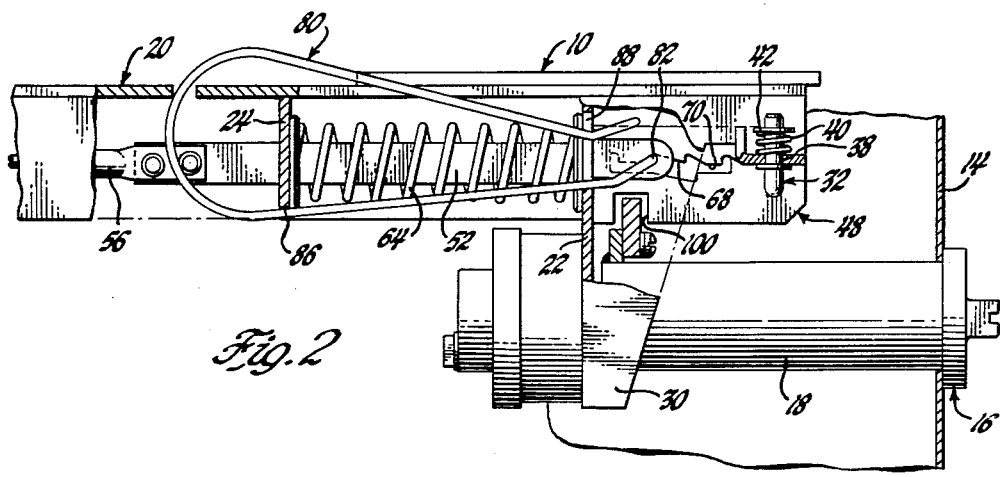
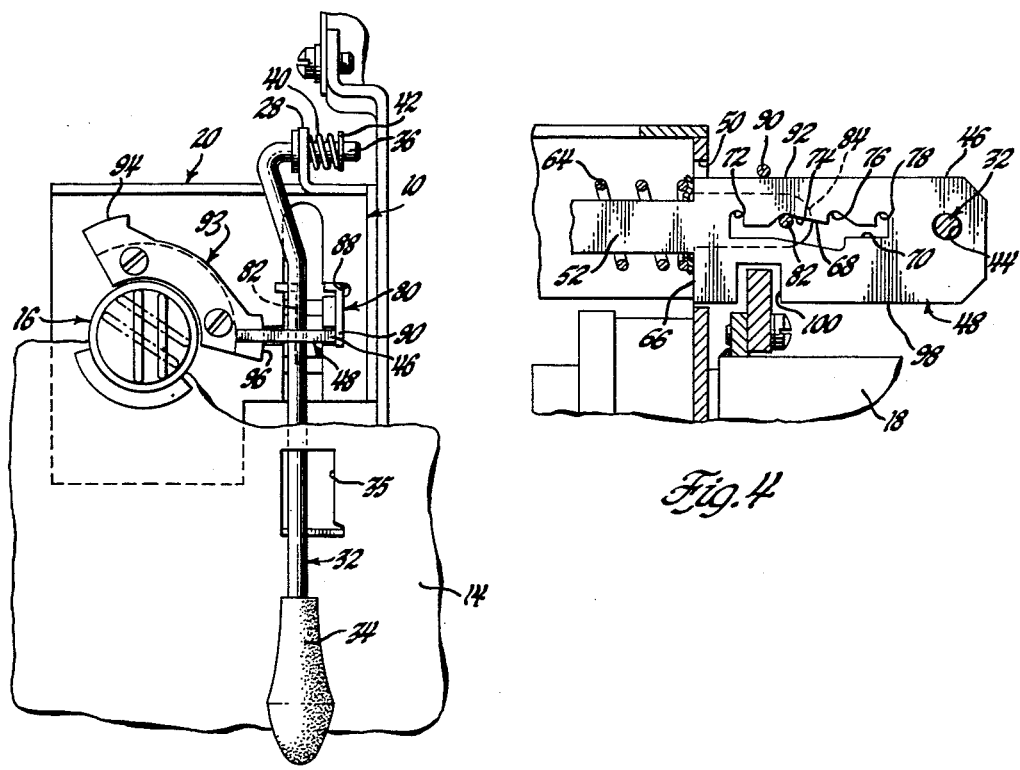

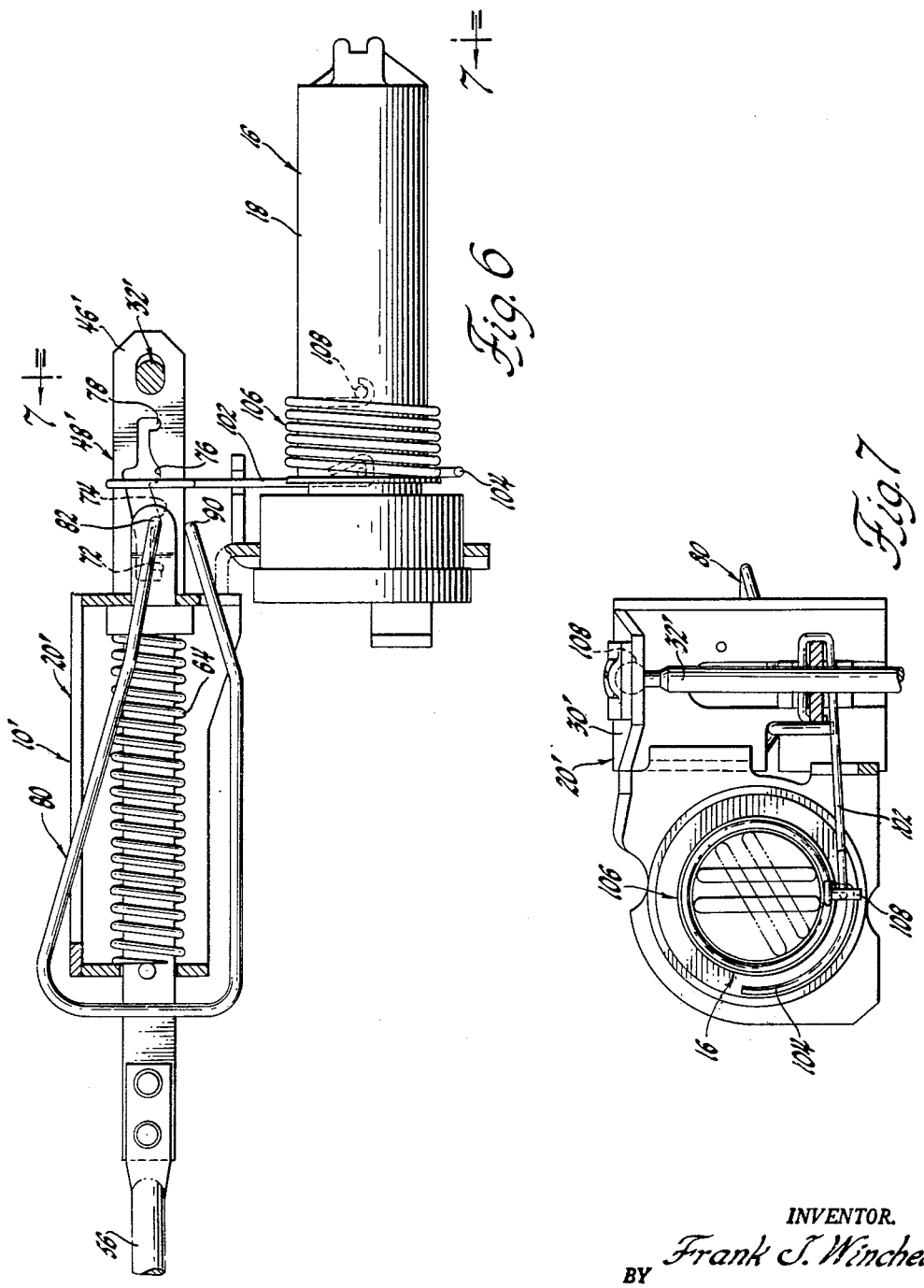

United States Patent Office 3,151,496
Patented Oct. 6, 1964

3,151,496
TRANSMISSION SHIFTER CONTROLS
Frank J. Winchell, Bloomfield Hills, Mich., assignor to General Motors Corporation, Detroit, Mich., a corporation of Delaware
Filed Apr. 17, 1961, Ser. No. 103,489
9 Claims. (Cl. 74—472)

This invention relates generally to manually operable controls and particularly to an improved shifter control adapted for use, although not exclusively, with automatic vehicle transmissions.

Efforts are being constantly made to provide a shifter control suitable for automatic vehicle transmissions that is very simple in design and that can be manufactured at a low cost. In achieving these desirable objectives, necessarily it must be kept in mind that the movements of the control must not be complex so as to require special education. Furthermore, the movements should preferably be of the type that would conform to normal reflex actions. For example, if an emergency should arise requiring quick action, the movement demanded for the occasion should be one normally expected.

Additionally, the control should be capable of operating a remotely situated transmission through a cable without demanding excessive effort on the part of the operator. The cable and remote disposition of the transmission presents a problem as to a mode of releasably establishing the different settings of the control, for it is possible that one part of the control may be in the selected setting and the other part not, if the detent provision does not operate properly.

Accordingly, the invention contemplates a unique shifter control that utilizes a minimum number of parts; that combines the functions of the parts in a new and different way; that requires only slight effort in operation; and that utilizes well-known movements conforming to normal reflex actions.

Moreover, it is proposed by the invention to provide a novel shifter control having a neutralizing or neutral seeking feature so that the shifter lever will always return automatically to the neutral setting whenever the shifter lever is relieved of restraint.

In those vehicles incorporating automatic transmissions, it is customary to prevent the vehicle operator from starting the engine until the transmission is conditioned for a so-called Neutral status. Without such a provision, it would be possible for the operator to start the engine while the transmission was prepared for either forward or reverse drive. As a consequence, upon starting the engine, the vehicle could lurch out of control and produce undesirable consequences.

For this reason, it has been customary to require prior to completing the engine cranking motor circuit that not only the ignition switch be closed but also another series switch be closed by movement of the transmission shifter lever to the Neutral setting. Therefore, this provision merely acted as a reminder.

Accordingly, one of the purposes of this invention is to eliminate the need for any reminder to the vehicle operator that the transmission must be placed in the Neutral setting before starting the engine. In accomplishing this, the invention further contemplates utilizing the act of starting the engine for also conditioning the transmission for neutral or no-drive operation in a positive manner. Specifically, the invention seeks to provide a shifter control that will automatically be placed in the Neutral setting whenever the vehicle engine is started.

The foregoing and other objects and advantages of the invention will be apparent from the following description and the accompanying drawings in which:

FIGURE 1 is a side view of a shifter control embodying the principles of the invention;

FIGURE 2 is a top view of the shifter control looking in the direction of arrows 2—2 in FIGURE 1;

FIGURE 3 is an end view of the shifter control looking in the direction of arrows 3—3 of FIGURE 1;

FIGURE 4 is a fragmentary sectional view of the shifter control taken along line 4—4 of FIGURE 1;

FIGURE 5 is a perspective view of the shifter control; and

FIGURES 6 and 7 are views of a modification of the shifter control.

Referring now to the drawings in detail, and particularly FIGURE 1, the numeral 10 designates generally the shifter control to be described, which for demonstration purposes is utilized to operate an automatic vehicle transmission 12. In this embodiment the selector control 10 is mounted on a part of an instrument panel 14 closely adjacent an ignition switch 16 of the type having the customary key operated cylinder 18. Both the shifter control 10 and the ignition switch 16 are positioned on the instrument panel 14 so as to be accessible to the vehicle operator either for lefthand operation, righthand operation, or both.

The shifter control 10 is joined to the instrument panel 14 by a support bracket 20, which bracket 20 extends substantially parallel to the longitudinal axis of the vehicle. The support bracket 20 also serves as a mounting for the cylinder 18, this being one of the functions of a front flange 22 to which the cylinder 18 is revolvably joined in any appropriate way. The support bracket 20 additionally has intermediate and rear flanges 24 and 26 successively spaced from the front flange 22. This disposition can be seen in either FIGURE 1 or 5.

From an inspection of FIGURE 5, it will be noted that the front flange 22 on the support bracket 20 has an upright tab 28 formed on a forwardly extending section 30 thereof. This tab 28 serves as a pivotal mounting for a downwardly extending shifter lever 32.

FIGURES 1 and 5 offer the best portrayal of the shifter lever 32, which includes a handle 34 that extends through an opening 35 in the instrument panel 14 and an offset end 36 that extends into an opening 38 in the tab 28. A coil spring 40 is positioned on the offset end 36 between a face of the tab 28 and an axially fixed spacer 42 so that the shifter lever 32 can be moved sidewise to a limited extent as well as fore and aft. The reasons for this will become more apparent.

The shifter lever 32 between the offset end 36 and the handle 34 is confined within an opening 44 in a front wide part 46 of a transfer lever 48 arranged to slide back and forth in a slot 50 provided therefor in the bracket 20. The transfer lever wide part 46 terminates into a narrow part 52 that in turn extends through an opening 54 in the support bracket intermediate flange 24 and is attached to the upper end of a cable 56. The cable 56 as shown in FIGURES 1 and 5 is enclosed by a sheath 58 attached at 60 to the rear flange 26 of the bracket 20 and is at the lower end joined to an external transmission control lever 62. The transmission control lever 62 determines in a known way the operating statuses of the transmission 12, which may include, e.g., Reverse, Neutral, Drive, and Low Ranges of operation.

In again considering FIGURE 5, it will be observed that a neutralizing spring 64 surrounds the narrow part 52 of the transfer lever 48 and is interposed between the two support bracket flanges 22 and 24. At the junction of the wide part 46 and the narrow part 52 of the transfer lever 48, an abutment shoulder identified by the numeral 66 is formed as viewed in FIGURE 4 and is employed to compress the spring 64 whenever the transfer lever 48 is shifted so as to move the abutment shoulder 66 into the space between the flanges 22 and 24. In the absence of any restraint, the spring 64 will be sufficiently preloaded to align the abutment shoulder 66 with the inside face of the flange 22 and in this way will always, as will become evident, return the transfer lever 48 to the Neutral setting.

The shifter lever 32 is releaseably maintained in different settings corresponding to the suggested Reverse, Neutral, Drive, and Low Range statuses for the transmission 12 by a detent provision incorporated in the transfer lever 48. As can be viewed in FIGURE 4, the wide part 46 of the transfer lever 48 is provided with a detent surface 68 along the edge of a detent slot 70 therein. This detent surface 68 includes stops or recesses 72, 74, 76, and 78 representing, respectively, the Reverse, Neutral, Drive and Low settings for the shifter lever 32. The releaseable restraint is afforded by a U-shaped bias element 80, one end 82 of which is positioned within the detent slot 70 and maintained fixed relative to the support bracket 20 by spaced ears 84 extending from the front flange 22 of the bracket 20 and positioned on each side of the wide part 46 of the transfer lever 48 as seen in FIGURES 1 and 5. In addition to the connection to the bracket 20 furnished by the ears 84, the bias element 80 is further supported upon the bracket 20 at 86 and 88, respectively, on the flanges 24 and 22 so that the bias element 80 is under tension and has the free or bias end 90 therefor in engagement with an edge 92 of the transfer lever 48 so that the detent surface 68 is maintained in engagement with the fixed end 82.

With the aforedescribed structure, movement of the shifter lever 32 from the Neutral setting illustrated in FIGURE 4 requires only that the lever 32 be moved in the desired direction of movement of the vehicle. Assuming that reverse vehicle movement is wanted, then the shifter lever 32 is moved rearwardly. The force applied to the shifter lever 32 will cause the transfer lever 48 to move so that the detent surface 68 will travel along the edge of the fixed end 82 of the bias element 80 until the recess 72 is engaged by the fixed end 82. In moving to the Reverse setting, the detent surface 68 will cause the shifter lever 32 to be moved sidewise slightly, this being permitted by the spring 40 mounted on the offset end 36 of the lever 32. The force afforded by the bias end 90 of the bias element 80 will maintain the shifter lever 32 in this Reverse setting until the shifter lever 32 is moved forwardly either to obtain Neutral or forward drive.

The initial movement of the shifter lever 32 in proceeding from the Reverse setting to either the Drive or the Low range settings requires that the shifter lever 32 be moved slightly sidewise so as to free the fixed end 82 of the biased element 80 from the recess 72 in the transfer lever 48. When free, the neutralizing spring 64 will immediately be effective to return the transfer lever 48 to the Neutral setting since the spring 64 will previously have been slightly compressed. This is because the narrow part 52 of the transfer member 48 at the flange 24 has a suitable abutment, functioning to hold the spring 64 in the same manner as abutment shoulder 66, to result in the slight compression.

If Low Range operation is desired, the shifter lever 32 is moved forwardly to the full extent permitted by the detent surface 68 until the fixed end 82 of the bias element 80 engages recess 78. To move out of this Low Range setting, the shifter lever 32 is merely moved sidewise sufficiently for the fixed end 82 to clear the edges of the recess 78 and then the neutralizing spring 64 will, since it has been compressed, quickly move the shifter lever 32 to the Drive Range setting, this being due to the configuration of the detent surface 68 and the Drive Range setting recess 76. In returning to Neutral, the shifter lever 32 need only again be moved slightly sidewise so that the fixed end 82 clears recess 76, whereupon the spring 64 will take over and return the shifter lever 32 to the Neutral setting. This arrangement affords a desirable Neutral seeking feature to the shifter control 10 in that release of either the Drive Range or Reverse Drive Range settings results automatically in the establishment of Neutral.

Another feature of the construction is the cooperation between the ignition switch 16 and the shifter control 10. To describe this, reference is first made to FIGURE 3 where, as can be observed, the cylinder 18 for the ignition switch 16 has joined thereto a cam 93 provided with angularly spaced neutral shifter and neutral locking lobes 94 and 96. These lobes 94 and 96 are so arranged as to bear against an edge 98 on the wide part 46 of the transfer lever 48 during rotation of the cylinder 18 by the usual key. Also, the edge 98 is formed with a locking portion, as notch 100, which, in the Neutral setting of the shifter lever 32, is aligned with the neutral locking lobe 96 as illustrated in FIGURES 3 and 4.

To describe this latter feature, it is assumed that the shifter lever 32 is in some setting other than Neutral and that it is desired to start the vehicle engine. To do this, the cylinder 18 will have to be rotated clockwise by the usual ignition key to the engine starting position shown by the broken lines in FIGURE 3. This causes the neutral shifter lobe 94 to be urged against the edge 98 of the transfer lever 48 and force the transfer lever 48 rightwardly from the FIGURE 3 position until the fixed end 82 of the bias element 80 is free from one of the recesses whereupon the neutralizing spring 64 will return the shifter lever 32 and transfer lever 48 to the Neutral setting. This affords a positive way of coordinating the act of starting the engine with the placing of the automatic transmission 12 in the Neutral setting, for the engine cannot be started without rotating the cylinder 18 the necessary angular amount and this act through the cam 93 causes the shifter lever 32 to be placed in the Neutral setting, if the lever 32 had been in some other setting.

Also to be considered is the act of turning the cylinder 18 counterclockwise to the ignition Off or the position in which the ignition switch 16 will be open and stop operation of the engine. In this arrangement this act causes the neutral locking lobe 96 to engage the edge 98 on the transfer lever 48 and as before shift the transfer lever 48 rightwardly from the FIGURE 3 position a sufficient amount to cause the fixed end 82 of the bias element 80 to be freed from one of the recesses, assuming that the transmission is not in Neutral and as before the neutralizing spring 64 will return the shifter lever 32 to the Neutral setting. The return of the shifter lever 32 to the Neutral setting now permits the cylinder 18 to be revolved the full extent to the Off position, since the notch 100 will become aligned as demonstrated in FIGURE 4 with the Neutral locking lobe 96 and further interference with this rotation will have been removed.

As can now be appreciated, with the ignition key removed, the cylinder 18 cannot be rotated, and consequently, the disposition of the neutral locking lobe 96 within the notch 100 prevents movement of the shifter lever 32 in either the forward or backward direction to a setting that would enable the transmission to operate. This affords a double prevention against theft; first, the cylinder 18 cannot be operated, and second, the transmission cannot be operated even if the ignition switch 16 is by-passed and the engine started.

In a modified selector control 10' viewed in FIGURES 6 and 7, a different transfer lever 48' is employed and has the recesses 72, 74, 76, and 78 facing in the opposite direction from those in the transfer lever 48. Accordingly, the bias element 80 is reversed. Surrounding the wide part 46' of the transfer lever 48' is one end of an arm 102. The opposite end of the arm 102 is connected to an arcuate end 104 of a coil spring 106 surrounding the cylinder 18. The other end of the spring 106 is affixed at 108 to the cylinder 18 so as to afford the desired tension. As can be seen, when the cylinder 18 is rotated clockwise in FIGURE 7 to the broken line position, the transfer lever 48' will be moved sidewise. Consequently, the fixed end 82 of the bias element 80 is removed from the recesses and the spring 64 can return the shifter control 10' to the Neutral setting.

The arcuate end 104 of the spring 106 is elongated so that the cylinder 18 can be rotated counterclockwise without becoming disengaged from the end of arm 102 and without interference or restraint from the transfer lever 48'.

A shifter lever 32' in this modification has a ball socket connection at 108 with the forwardly extending section 30' of the bracket 20'. This permits the shifter lever 32' to be swiveled as needed to select the different settings.

From the foregoing, it can now be appreciated that the shifter control 10 involves a minimum number of parts due particularly to the combined functions of the transfer lever 48 and the support bracket 20. With the depending shifter lever 32, additional leverage can be obtained merely by lengthening the lever 32. The disposition of the shifter lever 32 on the bracket 20 permits the movements to conform to those wanted of the vehicle, i.e., forward movement of the lever 32 produces forward drive, and reverse movement, reverse drive. Also, the neutralizing feature further reduces manual effort in that it eliminates the effort usually required to move the lever 32 to the Neutral setting and affords a setting from which forward and reverse drives are obtained by the corresponding forward and rearward movement of the lever 32, in each instance from the Neutral setting.

The invention is to be limited only by the following claims.

I claim:

1. A shifter control comprising a shifter member maneuverable to a series of settings, an output member, a transfer element interconnecting the shifter member and the output member, the transfer element also including a detent surface provided with stops therealong corresponding to certain ones of the settings, and a bias element having one end fixed and the other end acting on the transfer element so as to urge the detent surface into engagement with the fixed end of the bias element thereby releasably maintaining the shifter member in the selected settings thereof.

2. A shifter control comprising a shifter member maneuverable to a series of settings, an output member, a transfer element interconnecting the shifter member and the output member, the transfer element also including a detent surface provided with stops therealong corresponding to certain ones of the settings, and and a bias element having one end fixed and the other end acting on the transfer element so as to urge the detent surface into engagement with the fixed end of the bias element thereby releasably maintaining the shifter member in the selected setttings thereof, and a neutralizing spring so arranged as to urge the shifter member towards one of the settings thereof.

3. A transmission shifter control comprising a shifter member maneuverable to a series of settings, an output member, a transfer element interconnecting the shifter member between the ends thereof and the output member, the transfer element having a detent slot formed therein, the detent slot having recesses therein corresponding to certain ones of the series of settings, a bias element having one end fixed and positioned within the detent slot and a free end acting on the transfer element so as to urge the fixed end of the bias element into engagement within the recesses in the transfer element thereby releasably maintaining the shifter member in selected settings thereof, and a spring acting on the transfer element so as to return the shifter member to one of the settings from one of the other settings thereof whenever the fixed end of the bias element is disengaged from the associated recess.

4. A transmission shifter control comprising a support bracket, a manually operable shifter lever pivotally secured at one end to the bracket and maneuverable in opposite directions from a neutral setting to different settings, an output member, a transfer element interconnecting the shifter lever between the ends thereof and the output member, the transfer element including a slot provided with a detent surface therealong, the detent surface having recesses therein corresponding to certain ones of the shifter lever settings, a U-shaped bias element having one end affixed to the support bracket and a free end, the bias element being so positioned that the fixed end is confined within the slot and the free end acts on the transfer element so as to urge the fixed end of the bias element into engagement with the recesses thereby releasably maintaining the shifter lever in selected settings thereof, and a neutralizing spring so arranged as to always return the shifter lever to the neutral setting thereof whenever the fixed end of the bias element is disengaged from the associated recess.

5. A transmission shifter control comprising a support bracket, a manually operable shifter lever pivotally secured at one end to the bracket for movement in two different planes, the shifter lever being maneuverable in one plane in opposite directions from a neutral setting to different settings, an output member, a transfer element slidably supported on the bracket and arranged so as to be connected to the shifter lever between the ends thereof for movement therewith in said two different planes and also connected to the output member, the transfer element including a slot provided with a detent surface therealong, the detent surface having recesses corresponding to certain ones of the shifter lever settings, a U-shaped bias element positioned on the support bracket so as to have a fixed end thereof confined within the slot and a free end acting on the transfer element so as to urge the fixed end into engagement with the recesses thereby maintaining the shifter lever in selected settings thereof until released by movement of the shifter lever in the other plane, and a neutralizing spring so positioned relative to the transfer element and the shifter lever as to always return the shifter lever to the neutral setting from one of the other settings whenever the shifter lever is maneuvered in the other plane to disengage the bias element from the associated recess.

6. A transmission shifter control comprising a support bracket, a manually operable shifter lever pivotally secured at one end to the bracket for movement in two different planes, the shifter lever being maneuverable in one plane in opposite directions from a neutral setting to different settings, an output member, a transfer element slidably supported on the bracket and arranged so as to be connected to the shifter lever between the ends thereof for movement therewith in said two different planes and also connected to the output member, the transfer element including a stop shoulder and a slot provided with a detent surface therealong, the detent surface having recesses corresponding to certain ones of the shifter lever settings, a U-shaped bias element positioned on the support bracket so as to have a fixed end thereof confined within the slot and a free end acting on the transfer element so as to urge the fixed end into engagement with the recesses thereby maintaining the shifter lever in selected settings thereof until released by movement of the shifter lever in the other plane, and a neutralizing spring positioned on the transfer element and acting between the support bracket and the stop shoulder on the transfer element so as to always return the shifter lever to the neutral setting from one of the other settings whenever the shifter lever is maneuvered in the other plane to disengage the bias element from the associated recess.

7. In a transmission shifter control for an engine driven vehicle, the combination of a shifter member maneuverable to a series of settings, an output member, a transfer element interconnecting the shifter member and the output member, an ignition operating element, biasing means for placing the shifter member in one of the settings when the ignition operating element is moved to one position thereof, and mechanical means interconnecting the transfer element and the ignition operating element so that when the ignition operating element is moved to one position thereof the shifter element is placed in one of the settings.

8. In a transmission shifter control for an engine driven vehicle, the combination of a support bracket, a manually operable shifter lever having an end thereof pivotally connected to the bracket and being maneuverable to a series of settings including a neutral setting, an output member, a transfer element interconnecting the shifter lever and the output member, the transfer element being connected to the shifter lever between the ends thereof, the transfer element also including a detent surface provided with stops therealong corresponding to each of the series of settings for the shifter lever, a bias element having one end fixedly secured to the support bracket and the other end acting on the transfer element so as to urge the detent surface into engagement with the fixed end of the bias element thereby releasably maintaining the shifter lever in each of the series of settings, biasing means for returning the shifter lever to the neutral setting whenever the fixed end of the bias element is disengaged from the detent surface, an engine ignition operating element, and means interconnecting the ignition operating element and the transfer element so that when the ignition operating element is moved to one position thereof the shifter lever is caused to be placed in the neutral setting.

9. The transmission shifter control as claimed in claim 7 having a cylindrical member rotated by the ignition operating element, the cylindrical member arranged adjacent the transfer element, detent means on the transfer element acting in cooperation with spring means positioned relative to the detent means for releasably maintaining the shifter member in each of the settings, a coil spring surrounding the cylindrical member and having one end thereof fixed to the cylindrical member, an arm member having one end thereof suitably engaged with the other end of the coil spring, the other end of the arm member suitably connected to the transfer element, the coil spring being so tensioned that as the cylindrical member is rotated in one direction the transfer element is moved to release the detent means and when the cylindrical member is rotated in the other direction the cylindrical member will not become disengaged from the arm member and will not be interfered with or restrained by the transfer element.

References Cited in the file of this patent
UNITED STATES PATENTS

| | | |
|---|---|---|
| 2,015,834 | Banker | Oct. 1, 1935 |
| 2,826,929 | Lincoln et al. | Mar. 18, 1958 |
| 2,884,802 | Loofbourrow | May 5, 1959 |
| 2,916,031 | Parsons | Dec. 8, 1959 |

UNITED STATES PATENT OFFICE
CERTIFICATE OF CORRECTION

Patent No. 3,151,496 October 6, 1964

Frank J. Winchell

It is hereby certified that error appears in the above numbered patent requiring correction and that the said Letters Patent should read as corrected below.

Column 5, line 52, strike out "and", first occurrence; line 57, for "setttings" read -- settings --; column 7, line 7, for "element" read -- member --.

Signed and sealed this 9th day of February 1965.

(SEAL)
Attest:

ERNEST W. SWIDER
Attesting Officer

EDWARD J. BRENNER
Commissioner of Patents